(12) United States Patent
Tomono

(10) Patent No.: US 6,963,379 B2
(45) Date of Patent: Nov. 8, 2005

(54) HEAD-MOUNTED DISPLAY

(75) Inventor: Takao Tomono, Seoul (KR)

(73) Assignee: Samsung Electronics Co., Ltd., Gyeonggi-do (KR)

( * ) Notice: Subject to any disclaimer, the term of this patent is extended or adjusted under 35 U.S.C. 154(b) by 96 days.

(21) Appl. No.: 10/712,270

(22) Filed: Nov. 14, 2003

(65) Prior Publication Data

US 2004/0150758 A1    Aug. 5, 2004

(30) Foreign Application Priority Data

Dec. 5, 2002   (KR) ...................... 10-2002-0076995

(51) Int. Cl.⁷ .............................................. G02F 1/13
(52) U.S. Cl. ........................... 349/11; 349/13; 359/630
(58) Field of Search ..................... 349/11, 13; 359/630

(56) References Cited

U.S. PATENT DOCUMENTS

| | | | | |
|---|---|---|---|---|
| 4,195,915 A | * | 4/1980 | Lichty et al. .................. | 349/11 |
| 4,447,128 A | * | 5/1984 | Ferrer .......................... | 349/11 |
| 5,483,307 A | * | 1/1996 | Anderson ..................... | 353/98 |
| 5,506,728 A | * | 4/1996 | Edwards et al. ............. | 359/629 |
| 5,644,323 A | * | 7/1997 | Hildebrand et al. .......... | 345/8 |
| 5,729,242 A | * | 3/1998 | Margerum et al. ............ | 345/7 |
| 5,793,339 A | * | 8/1998 | Takahashi ...................... | 345/7 |
| 5,808,801 A | * | 9/1998 | Nakayama et al. ......... | 359/630 |
| 5,933,279 A | * | 8/1999 | Yamazaki ................... | 359/630 |
| 6,396,463 B1 | * | 5/2002 | Tomono ........................ | 345/8 |
| 6,445,507 B2 | * | 9/2002 | Togino et al. .............. | 359/637 |
| 6,697,200 B2 | * | 2/2004 | Nagaoka ..................... | 359/630 |

* cited by examiner

Primary Examiner—Kenneth Parker
(74) Attorney, Agent, or Firm—Sughrue Mion, PLLC

(57) ABSTRACT

A head-mounted display (HMD) is provided. The HMD includes: an image-forming unit that produces and emits an image; a half mirror disposed obliquely with respect to the image-forming unit for transmitting some part of the image entering from the image-forming unit and transmitting the remaining part; a pinhole located at a focal point of the image reflected from the half mirror for transmitting the incident image and focusing the transmitted image onto a dark space within the housing; a collimating lens disposed opposite the pinhole with respect to the half mirror for converging the incident divergent image and producing parallel light; a prism unit disposed opposite the collimating lens for guiding the path of the incident image; and a Fresnel lens disposed opposite a part of the prism unit for focusing the incident image onto an eyeball. A user wearing the HMD can view the image formed in the housing through the pinhole.

11 Claims, 3 Drawing Sheets

HEAD-MOUNTED DISPLAY

BACKGROUND OF THE INVENTION

This application claims priority from Korean Patent Application No. 2002-76995, filed Dec. 5, 2002, the contents of which are incorporated herein by reference in their entirety.

1. Field of the Invention

The present invention relates to a head-mounted display (HMD) designed to view video images when mounted on a user's head and, more particularly, to a head-mounted display using retinal direct projection and having a small size and high resolution.

2. Description of the Related Art

In general, head-mounted displays (HMDs) appear in the form of eyeglasses or helmets. AN HMD is a personal see-through device designed to display video images to a user. The HMD is considered a magnifier-type HMD, an optical relay lens-type HMD, or a retinal direct projection-type HMD depending on the optical system configuration.

While a magnifier-type HMD can produce a virtual image with a large field of view through a very small magnifier lens, it increases eye fatigue. AN HMD using a relay lens reduces eye fatigue because a viewer can observe an image displayed on the screen from a distant position, but its size is too large to be conveniently contained in a helmet. A retinal direct projection-type HMD that has an image displayed on the screen directly projected onto the retina not only reduces eye fatigue but also makes the size of a display smaller than when the relay lens is used.

FIG. 1 shows a conventional HMD using retinal direct projection technology disclosed in Japanese Patent Laid-Open Publication No. hei 3-214872 (Sep. 20, 1991).

Referring to FIG. 1, the conventional HMD includes a point light source 1 consisting of a tungsten lamp, a condensing lens 2 for focusing light emitted from the point light source 1, a plurality of reflectors 3 and 4 for converting the path of incident light, eyepieces 5, 7, and 8 consisting of three element lenses, and an image plate 6 positioned between the eyepieces 5 and 7 for producing an image by selectively transmitting the incident light. This conventional HMD device focuses the image irradiated from the point light source and produced by passing through the transmissive image plate 6 at an eyeball 9 focal point.

However, as described above, the conventional HMD cannot reduce its size because it requires a plurality of optical components such as condensing lens 2, reflectors 3 and 4, and eyepiece 5 between the point light source 1 and image plate 6. Furthermore, it cannot provide a sufficiently high resolution since an incandescent lamp is used as the point light source 1.

SUMMARY OF THE INVENTION

An apparatus consistent with the present invention provides a head-mounted display (HMD) designed to have a small size and provide a high-resolution image by changing the optical components and optical arrangement from those taught by the related art.

According to an embodiment of the present invention, there is provided an HMD, installed in a housing of a predetermined shape, for displaying an image to a user. The HMD includes: at least one image-forming unit that produces and emits an image; a half mirror disposed obliquely with respect to the image-forming units for reflecting some part of the image incident from the image-forming units and transmitting the remaining part; a pinhole located at a focal point of the image reflected from the half mirror for transmitting the incident image and focusing the transmitted image onto a dark space within the housing; a collimating lens disposed opposite the half mirror for converging the incident divergent image and producing parallel image; a prism unit disposed opposite the collimating lens for guiding the path of the incident image; and a Fresnel lens disposed opposite a part of the prism unit for focusing the incident image onto an eyeball of the user. A user wearing the HMD can view the image formed in the housing through the pinhole.

The prism unit comprises first and second prisms. The first prism comprises a first entrance face disposed opposite the collimating lens, a first reflection face through which the image entering through the first entrance face is reflected, and a first exit face through which the image reflected from the first reflection face exits. The second prism has a second entrance face disposed opposite the first exit face, a second reflection face through which the incident image is reflected, and an exit reflection face where the image entering from the second entrance face is reflected onto the second reflection face while the image incident from the second reflection face exits toward the Fresnel lens.

BRIEF DESCRIPTION OF THE DRAWINGS

The above aspects and advantages of the present invention will become more apparent by describing in detail illustrative, non-limiting embodiments thereof with reference to the attached drawings, in which.

DETAILED DESCRIPTION OF ILLUSTRATIVE, NON-LIMITING EMBODIMENTS OF THE INVENTION

Head-mounted displays (HMDs) according to illustrative, non-limiting embodiments of the present invention will now be described in detail with reference to the accompanying drawings.

Figure 1:
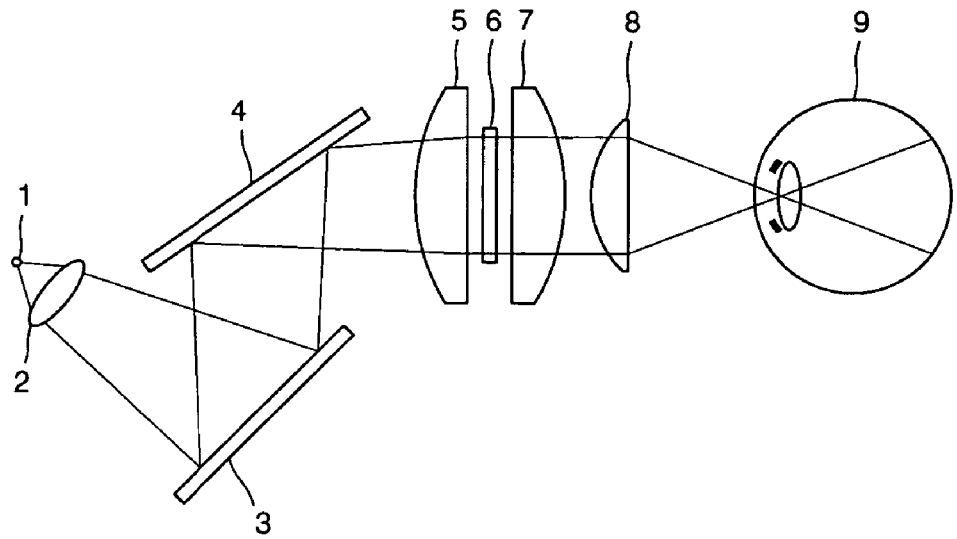
FIG. 1 shows the optical arrangement of a conventional head-mounted display (HMD)
Figure 2:
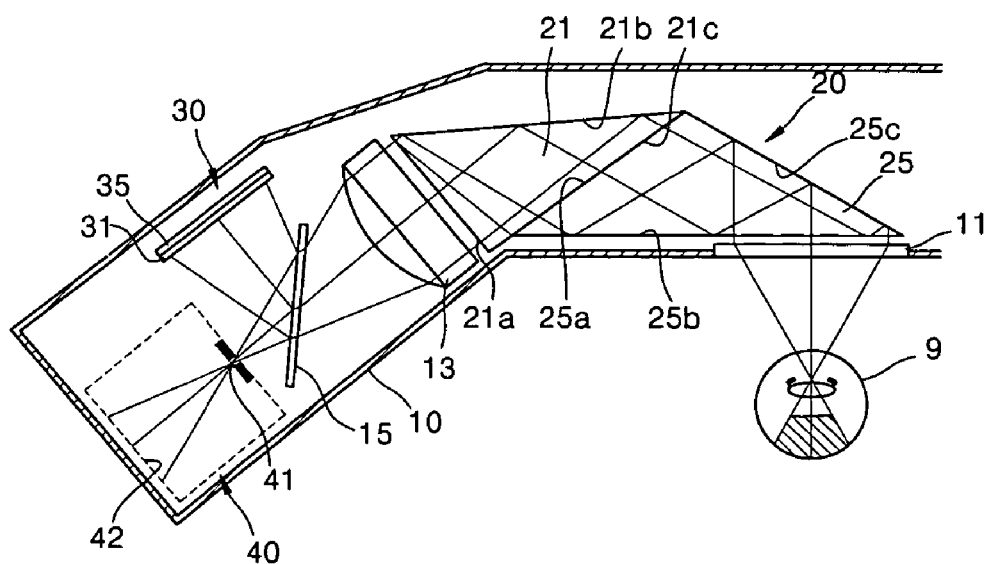
FIG. 2 shows the optical arrangement of an HMD according to an embodiment of the present invention.

Referring to FIG. 2, an HMD includes an image-forming unit 30 that produces and emits an image, a half mirror 15 that reflects a part of image received from the image-forming unit 30 and transmits the remaining part, a pinhole 41, a collimating lens 13 disposed opposite the half mirror 15, a prism unit 20 disposed opposite the collimating lens 13 from the half mirror 15 and for guiding the path of an incident image, and a Fresnel lens 11 that focuses the incident image onto an eyeball 9.

The Fresnel lens 11 with a diffraction pattern on a flat plate is constructed to focus an incident image through the diffraction pattern. The Fresnel lens 11 preferably, but not necessarily, has a Fresnel pattern corresponding to the aspheric shape to correct chromatic aberration. Here, the aspheric shape refers to the distribution of curvature in a typical aspheric lens, and the distributed curvature forms a Fresnel pattern. The Fresnel pattern is produced by rotary cutting. The Fresnel lens is widely known in the art, so further description is not necessary.

The prism unit 20 is disposed in the optical path between the collimating lens 13 and Fresnel lens 11 for directing the image produced and reflected by the pinhole 41 onto the Fresnel lens 11. Here, the prism unit 20 is preferably, but not necessarily, constructed so that the incident image can undergo total reflection at least three times in order for the image to be incident in a direction perpendicular to the eyeball 9 while facilitating an arrangement of the HMD to fit on a user's head.

To achieve these purposes, the prism unit 20 comprises first and second prisms 21 and 25. The first prism 21 comprises a first entrance face 21a disposed opposite the collimating lens 13, a first reflection face 21b through which the image entering through the first entrance face 21a is reflected, and a first exit face 21c through which the image reflected from the first reflection face 21b exits.

The second prism 25 comprises a second entrance face 25a disposed opposite the first exit face 21c, a second reflection face 25c through which the incident image is reflected, and an exit reflection face 25b where the image entering from the second entrance face 25a is reflected onto the second reflection face 25c while the image incident from the second reflection face 25c exits toward the Fresnel lens 11.

The collimating lens 13 focuses divergent light produced by the pinhole 41 and transmitted through the half mirror 15 and produces a parallel light. Optionally, the collimating lens 13 is made of methacrylic resin as a main component and is aspheric to correct optical aberration. The methacrylic resin, also called polymethylmethacrylate (PMMA), is a rigid, optically transparent vinyl-family plastic.

The image-forming unit 30 for producing and emitting an image comprises a planar backlight 35 and a transmissive liquid crystal display (LCD) 31 placed in front of the planar backlight 35.

The planar backlight 35, which is a light source for producing and emitting planar light, may be a light-emitting element formed from organic or inorganic electroluminescence (EL) material on a plane. For the planar backlight 35, it is also possible to adopt a backlight including a linear light source on the side and a light guide plate (not shown) that produces a parallel beam.

The transmissive LCD 31 is positioned in an optical path between the planar backlight 35 and the half mirror 15 and is driven on a pixel-by-pixel basis to form an image by selectively transmitting the incident parallel light. The transmissive LCD 31 is well known in the art, and further description will be omitted.

An image-forming unit according to another embodiment of the present invention comprises a self-emitting display device (not shown) such as a light-emitting diode (LED). The self-emitting display device operates so that each of a plurality of light-emitting elements, such as LEDs, arranged two-dimensionally on a plane selectively emits light on a pixel-by-pixel basis in order to form an image. By adopting the self-emitting display device as an image-forming unit, the embodiment eliminates the need for a backlight, thus simplifying the structure.

The half mirror 15 is disposed obliquely with respect to the image-forming unit 30 and reflects some part of an image incident from the image-forming unit 30 and transmits the remaining part of the image. The image reflected from the half mirror 15 is directed toward the pinhole 41. The pinhole 41 is located at a focal point of an image reflected from the half mirror 15 and transmits the incident image. The transmitted image is then focused on a screen 42 disposed on one side of a pinhole housing 40 which is located within a housing 10. The pinhole housing 40 represents a dark space within the housing 10 and is not necessarily a separate component. However, the pinhole housing 40 may be constructed from a separate component than the housing 10.

The principle of focusing the image onto the screen 42 using the pinhole is the same as that of pinhole camera.

Figure 3:
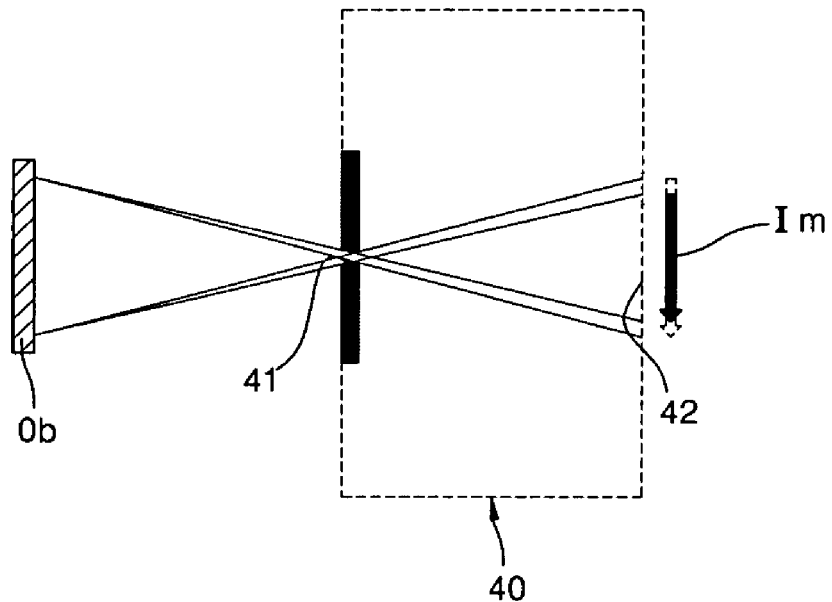
FIGS. 3 and 4 show examples of displaying an image using the principle of a pinhole camera.

Referring to FIG. 3, the principle of an optical system using a pinhole 41 will now be described. The area wherein an image is formed by the pinhole housing 40 is a dark space. In the apparatus of FIG. 3, an object Ob and the screen 42 located outside of the pinhole housing 40 have a conjugate relation through the pinhole 41. Thus, an inverse real image Im of the object Ob is produced on the screen 42. Here, the diameter of the pinhole 41 is preferably, but not necessarily, about 0.3 mm, and the screen 42 corresponds to a film plane of the pinhole camera.

Figure 4:
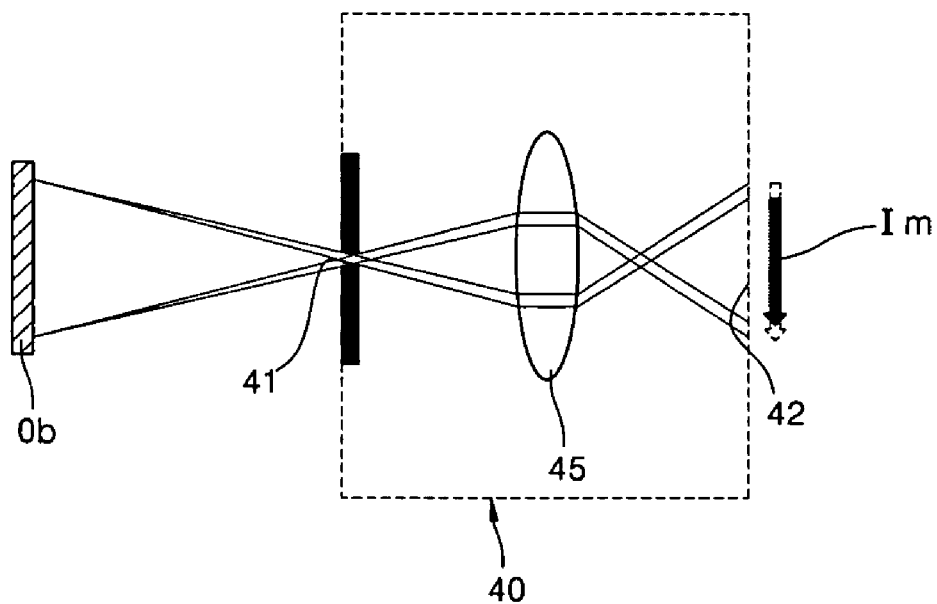

As shown in FIG. 4, the pinhole optical system may optionally include a condensing lens 45 for reversing the image being formed on the screen 42 to be in the same orientation as the original object Ob.

The operation of the HMD configured above will now be described. The image produced by the image-forming unit 30 is reflected from the half mirror 15 and directed towards the pinhole 41. The image transmitted through the pinhole 41 is focused onto the screen 42.

Thus, the user wearing the HMD on his/her head can view the image produced by the image-forming unit 30 and focused onto the screen 42 through operation of the Fresnel lens 11, the prism unit 20, the collimating lens 13, and the half mirror 15.

Figure 5:
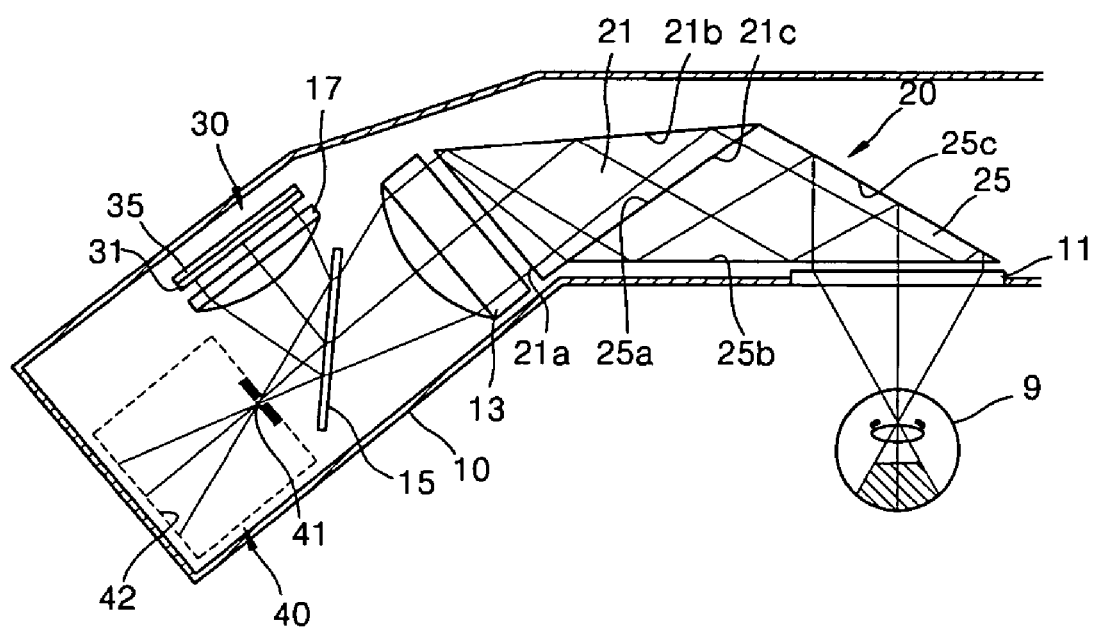
FIG. 5 shows the optical arrangement of an HMD according to an embodiment of the present invention.

FIG. 5 shows an HMD according to another embodiment of this invention. The optical components of the HMD of this embodiment are substantially the same as those denoted by the same reference numerals and described with reference to FIG. 2. The FIG. 5 embodiment includes a condensing lens 17 for converging the image produced by the image-forming unit 30.

The condensing lens 17 is disposed on the optical path between the image-forming unit 30 and half mirror 15 to converge the incident image. As described earlier, the focusing lens 17 is preferably, but not necessarily, aspheric like the collimating lens 13 and made of methacrylic resin.

Figure 6:
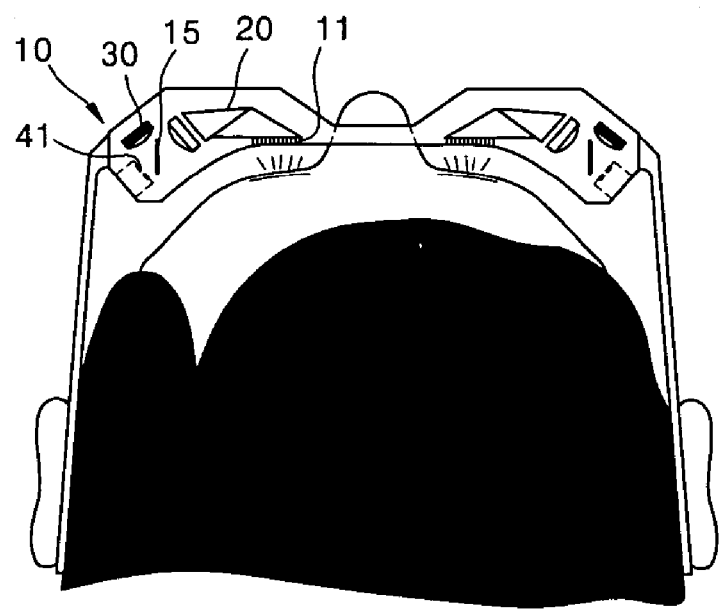
FIG. 6 shows an HMD according to an embodiment of the present invention mounted on a user's head.

FIG. 6 shows an HMD according to this invention mounted on a user's head. As shown in FIG. 6, the HMD of this invention can be designed in the form of eyeglasses by miniaturizing the optical components and effectively arranging them using the prism unit.

The HMD of the present invention provides a miniaturized size and light weight by using the pinhole camera principle and effectively arranging the optical components using the prism unit. Thus, the HMD can be designed to resemble eyeglasses and is easy to wear.

Although exemplary embodiments of the present invention have been described, it will be understood by those skilled in the art that the present invention should not be limited to the described exemplary embodiments, but various changes and modifications can be made within the spirit and scope of the present invention as defined by the appended claims.

What is claimed is:

1. A head-mounted display, provided in a housing of a predetermined shape, for displaying an image to a user, the head-mounted display comprising:

at least one image-forming unit that produces and emits an image;

a half mirror disposed obliquely with respect to the image-forming units for reflecting some part of the image incident from the image-forming units and transmitting the remaining part;

a pinhole located at a focal point of the image reflected from the half mirror for transmitting the incident image and focusing the transmitted image onto a dark space within the housing;

a collimating lens disposed opposite the half mirror for converging the incident divergent image and producing a parallel image;

a prism unit disposed opposite the collimating lens for guiding the path of the incident image; and a Fresnel lens disposed opposite a part of the prism unit for focusing the incident image onto an eyeball of the user, wherein the image formed in the housing through the pinhole is viewed by the user.

2. The head-mounted display of claim 1, wherein the Fresnel lens has a Fresnel pattern corresponding to an aspheric shape to correct chromatic aberration.

3. The head-mounted display of claim 1, wherein the prism unit is constructed so that the incident image undergoes reflection at least three times.

4. The head-mounted display of claim 1, wherein the prism unit comprises:

a first prism comprising a first entrance face disposed opposite the collimating lens, a first reflection face through which the image entering through the first entrance face is reflected, and a first exit face through which the image reflected from the first reflection face exits; and a second prism comprising a second entrance face disposed opposite the first exit face, a second reflection face through which the incident image is reflected, and an exit reflection face where the image entering from the second entrance face is reflected onto the second reflection face while the image incident from the second reflection face exits toward the Fresnel lens.

5. The head-mounted display of claim 1, wherein the collimating lens is aspheric.

6. The head-mounted display of claim 1, wherein the collimating lens comprises methacrylic resin.

7. The head-mounted display of claim 1, further comprising a condensing lens disposed in an optical path between the image-forming unit and half mirror for converging the image incident from the image-forming unit.

8. The head-mounted display of claim 7, wherein the condensing lens is aspheric.

9. The head-mounted display of claim 7, wherein the condensing lens comprises methacrylic resin.

10. The head-mounted display of claim 1, wherein the image-forming unit comprises:

a planar backlight that produces and emits planar light; and a transmissive liquid crystal display placed in front of the planar backlight for selectively transmitting the incident light on a pixel-by-pixel basis and forming an image.

11. The head-mounted display of claim 1, wherein the image-forming unit is a self-emitting display device that selectively emits light on a pixel-by-pixel basis and forms an image.

* * * * *